United States Patent Office 3,137,777
Patented June 16, 1964

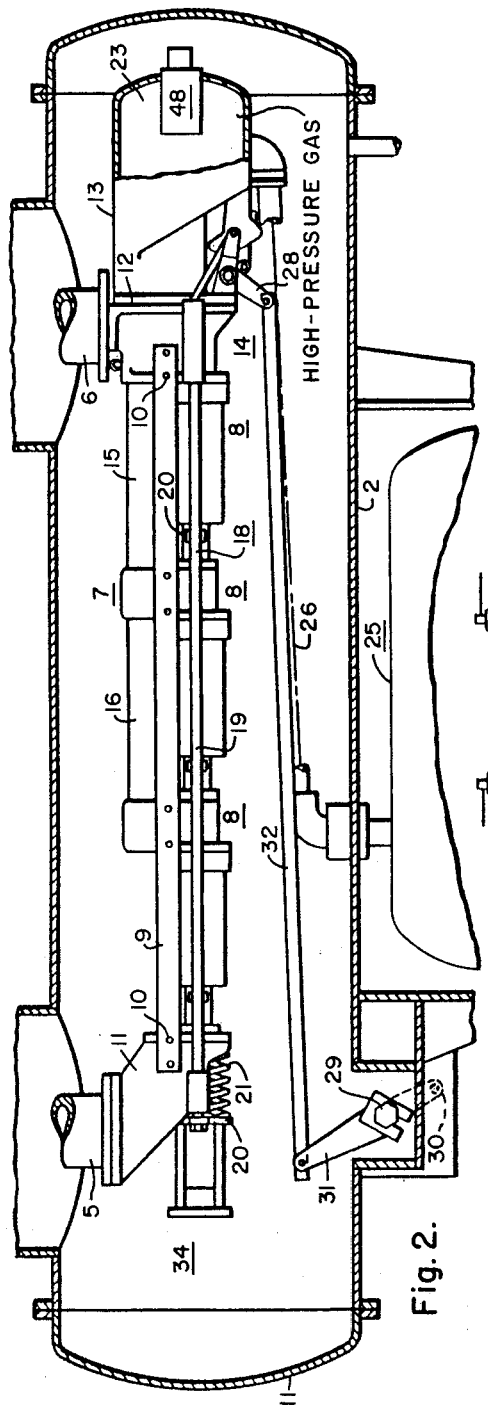
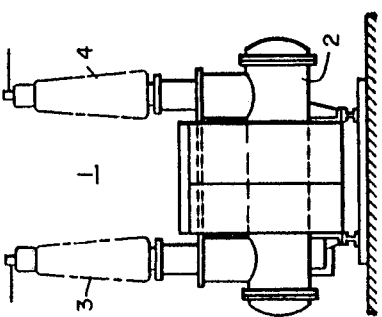

3,137,777
COMPRESSED-GAS CIRCUIT INTERRUPTER WITH MEANS FOR MAINTAINING TEMPERATURE OF GAS THEREIN
Russell N. Yeckley, Monroeville, and William M. Kreh, Penn Township, Westmoreland County, Pa., assignors to Westinghouse Electric Corporation, East Pittsburgh, Pa., a corporation of Pennsylvania
Filed June 15, 1961, Ser. No. 117,449
1 Claim. (Cl. 200—148)

This invention relates to gas-conditioning systems for compressed-gas circuit interrupters and, more particularly, to systems for controlling the temperature of the gas stored within the circuit interrupter.

A general object of the present invention is to provide an improved compressed-gas circuit interrupter in which the temperature of the high-pressure gas is maintained at a predetermined minimum point.

Another object of the present invention is to provide an improved compressed-gas circuit interrupter of the type utilizing a substantially closed gaseous system including a compressor, in which relatively high-pressure gas is bled from the high-pressure tank, at a predetermined drop of temperature thereof, into the compressor for extracting heat from the compression operation to raise the temperature of the compressed-gas for subsequent storage in the high-pressure chamber.

Accordingly, the temperature of the high-pressure gas within the high-pressure chamber will be raised by the operation of the compressor in accordance with the principles of the present invention.

Yet a further object of the present invention is the provision of an improved temperature-responsive valve mechanism for providing valve operation as a function of the temperature of the stored gas.

Yet a further object of the present invention is the provision of an improved compressed-gas dual-pressure circuit interrupter utilizing a relatively high-pressure tank and a relatively low-pressure tank in which bleeding means are associated with the relatively high-pressure tank and responsive to the temperature of the gas therein for effecting operation of the compressor, and thus utilizing the heat of compression for raising the temperature of the high-pressure gas to a desired value.

The present invention is particularly concerned with the utilization of the heat of compression of the compressor for maintaining the temperature of the high-pressure gas at a predetermined value. This is brought about by deliberately bleeding gas to the compressor from the high-pressure reservoir chamber by a predetermined drop of temperature therein.

Further objects and advantages will readily become apparent upon reading the following specification, taken in conjunction with the drawings, in which:

FIGURE 1 is an end elevational view of a three-pole compressed-gas circuit interrupter embodying features of the present invention;

FIG. 2 is a longitudinal vertical sectional view taken through one of the three tank structures of the three-phase circuit interrupter of FIG. 1, illustrating the arc-extinguishing assemblage in the closed-circuit position thereof;

Figure 3:
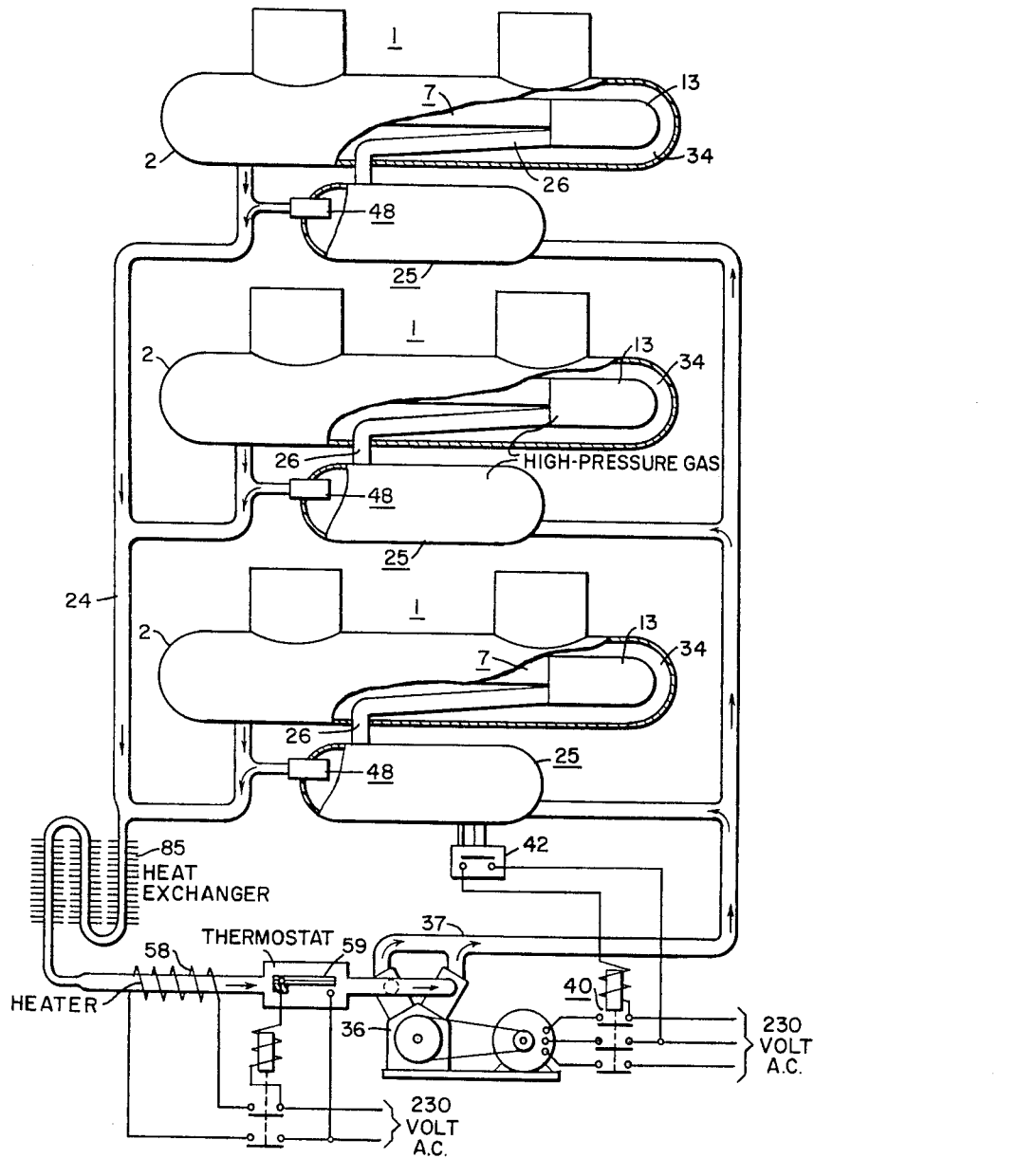
FIG. 3 is a somewhat diagrammatic view illustrating the operation of the gas-bleeding means of the present invention.

Referring to the drawings, and more particularly to FIG. 1 thereof, the reference numeral 1 generally designates a three-pole three-phase dual-pressure compressed-gas circuit interrupter including a grounded metallic tank 2 for each pole of the interrupter. Each of the three tank structures 2 has associated therewith a pair of downwardly extending terminal bushings 3, 4. As shown in FIG. 2, at the lower interior ends 5, 6, of the bushings 3, 4 respectively, there is disposed, in bridging relation, an arc-extinguishing assemblage, generally designated by the reference numeral 7.

As viewed in FIG. 2, the arc-extinguishing assemblage 7 generally comprises a plurality of orifice-type gas-blast interrupting units 8 fixedly maintained in a relatively fixed position by a pair of longitudinally extending spaced insulating tie-rods 9. The pair of support rods 9 are fixedly secured by suitable fastening means, such as bolts 10, to support castings 11, 12 clamped to the lower extremities 5, 6 of the terminal bushings 3, 4 respectively.

Disposed at the right-hand end of the arc-extinguishing assemblage 7, as viewed in FIG. 2, is a high-pressure tank 13. Blast-valve means 14 are associated with the high-pressure reservoir tank 13 to control the blasting of arc-extinguishing gas through blast tubes 15, 16 to the interior of the orifice-type gas-blast interrupting units 8, in a manner more fully illustrated and described in United States patent application filed October 7, 1960, Serial No. 61,284, by Robert G. Colclaser, Jr. and Russell N. Yeckley, and assigned to the assignee of the instant application.

The arc-extinguishing assemblage 7, in addition to the three gas-blast circuit-interrupting units 8, also includes a movable contact assemblage, generally designated by the reference numeral 18, a side view of which is more clearly illustrated in FIG. 2 of the drawings. Generally, the movable contact assemblage 18 comprises a pair of longitudinally extending spaced-apart insulating operating rods 19 having transverse cross-members 20 extending therebetween. A compression spring 21 biases the left-hand cross-bar 20, and hence the entire movable contact assemblage 18 in a leftward opening direction, as viewed in FIG. 2. The other transverse cross-bars 20 have movable contact rods, not shown, attached to the central portions thereof, which makes separable contacting engagement with relatively stationary contact structures also not shown. Reference may be had to the aforesaid patent application for a detailed description of the configuration of the relatively stationary and movable contact structures. For the purpose of understanding the present invention, however, it is only necessary to know that it is desired to utilize compressed-gas 23, disposed within the high-pressure tank 13, to effect extinction of the plurality of serially related arcs drawn between the separated contact structures during the opening operation.

Interconnecting the high-pressure reservoir tank 13 with an externally disposed high-pressure tank 25 is an interconnecting feed tube 26. Additionally, the arc-extinguishing assemblage 7 has associated therewith a crank-arm mechanism 28, which is linked to the movable contact assemblage 18. Thus, rotation of the crank-shaft 29 by actuation of the externally disposed crank-arm 30 effects corresponding interior rotation of the crank-arm 31, and hence longitudinal leftward closing movement of the insulating operating rod 32 under tensile stress. The leftward closing movement of the insulating operating rod 32 effects corresponding clockwise rotation of the crank structure 28 and consequent closing of the movable contact assemblage 18 with resultant contact engagement between the several relatively movable and relatively stationary contacts, not shown.

As set forth in the aforesaid patent application, the exhausting of the high-pressure gas, following the use within the several gas-blast interrupting units 8 into the general interior 34 of the tank structure 2, gradually raises the pressure therein, and consequently reduces the pressure within the high-pressure reservoir tank 13. For this reason, a suitable compressor 36 (FIG. 3) is provided to effect recompression of the relatively low-pressure gas within the exhaust tank 2 and to force the compressed gas out of the exhaust portion 37 thereof and back into the auxiliary high-pressure reservoir tanks 25. The closing of the contactor 40 to effect energization of the electrically-actuated compressor 36 may be responsive to temperature-compensated pressure switches 42, as shown in FIG. 3 of the drawings.

Many gases useful as interrupting medium for circuit interrupters have a pressure temperature characteristic such that when contained at a pressure sufficient for interrupting, the temperature at which the gas liquefies is relatively warm. As an example, the vaporization temperature for sulfur-hexafluoride gas at 200 p.s.i.g. is 45° F.

The dual-pressure compressed-gas circuit interrupter 1, as illustrated in FIGS. 1 and 2, is of the double-pressure type. A high-dielectric-strength gas, such as sulfur hexafluoride ($SF_6$) gas, is stored in a high-pressure reservoir 13, which, during an interruption, is released by a large blast valve so as to blast through the arcs within the compressed-gas interrupting units 8, and is exhausted to the low pressure system, thereby effecting extinction of the plurality of serially related arcs. The system is completed by a compressor 36, which reclaims the gas discharged during the interruption and compresses it into the high-pressure system. To prevent liquefaction of the high-pressure gas at temperatures below 45° F., it is necessary to provide heat in the auxiliary high-pressure reservoir 25. In past designs of breakers of this type, as set forth in United States patent application filed January 23, 1959, Serial No. 788,668, now Patent No. 3,057,983, issued October 9, 1962, to Russell N. Yeckley, Joseph Sucha and Benjamin P. Baker, and assigned to the assignee of the instant application, there had been utilized conventional thermostatically-controlled heaters in each reservoir 25.

The present invention describes a method of heating the high-pressure system in tanks 25 and 13 by utilizing the heat of compression in the compressor 36; and also the present invention is concerned with a unique type of temperature-control valve.

As illustrated in FIG. 3, the pressure within the high-pressure system is controlled by temperature-compensated pressure switches, illustrated and claimed in United States patent application filed April 12, 1960, Serial No. 21,681, now United States Patent 3,129,309 issued April 14, 1964 to Daniel H. McKeough and Karl K. Franz, and assigned to the assignee of the instant application. If the temperature in the high-pressure reservoir 25 approaches the liquefaction temperature (45° F.), the temperature-controlling valve 48 in the reservoir 25 will open, thereby bleeding gas from the high-pressure reservoir 25, causing a pressure drop. This drop in pressure will cause the compressor 36 to operate by closing of the contactor 40. The compressor 36 will operate until the gas in the reservoir 25 is heated to the required temperature, at which the temperature-controlled valve 48 shuts off, and the reservoirs 25 have attained the proper pressure.

Figure 4:
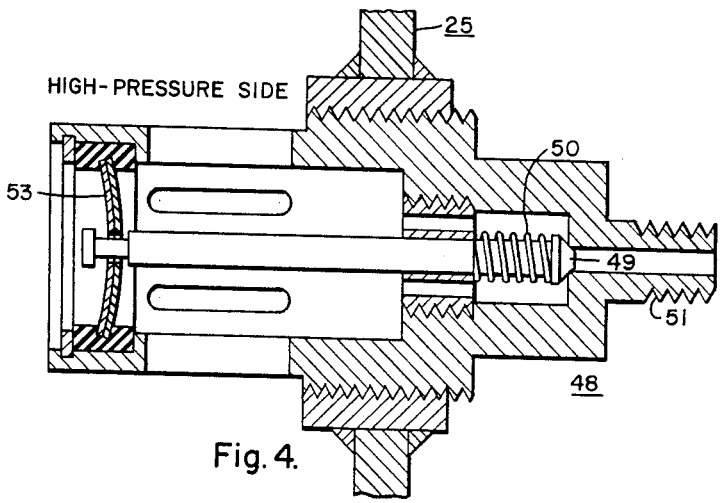
FIG. 4 is a longitudinal sectional view taken through the improved temperature-responsive valve means of the present invention, the valve structure being illustrated in the closed position.
Figure 5:
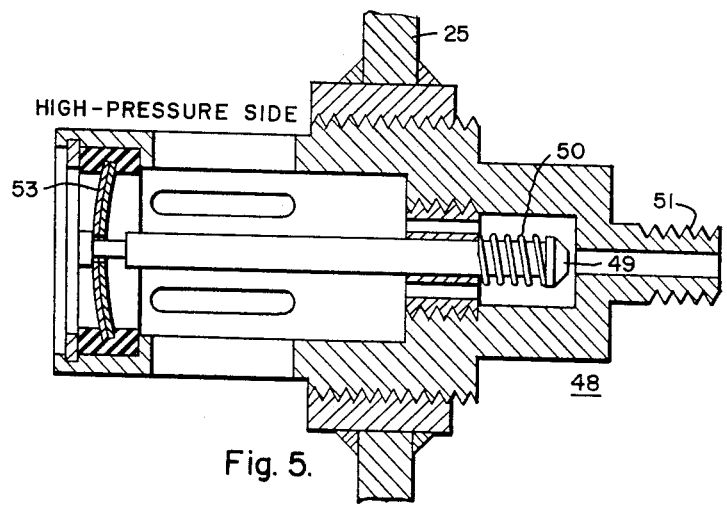
FIG. 5 is a view somewhat similar to that of FIG. 4, but illustrating the temperature-responsive valve in the open position; and, FIG. 6 is a fragmentary view illustrating a modified type of thermostatically-actuated valve-bleeder means.

FIGS. 4 and 5 illustrate more clearly the specific temperature-controlled valve 48 of the present invention. It will be observed that the poppet-type valve 49 is held closed by a biasing spring 50 and the gas pressure within the tank 25. The right-hand connector 51 is connected to the low-pressure side of the compressor 36. The bimetallic washer 53 is situated in the high-pressure gas, so that its temperature is representative of the gas. With the decrease in temperature of the gas approaching liquefaction, the bimetallic washer 53 will be calibrated to snap over toggle, as shown in FIG. 5, and open the valve 49. As the gas escapes out of the tank 25, the compressor 36 will operate to maintain the pressure, thereby heating the gas. When the proper temperature is attained, the bimetallic washer 53 will snap back to the closed position, as illustrated in FIG. 4. The left-hand section of the valve 48, containing the bimetallic washer 53, is inserted well into the high-pressure gas through a port in the tank wall 25.

According to calculations, hereinafter set forth, a 3/32" diameter valve will provide sufficient gas flow for heating purposes and not so great that the compressor 36 cannot maintain pressure with all of the valves 48 fully open. Under extreme cool temperature conditions, the heat of compression may not be sufficient to heat the gas to the required temperature. This situation is taken care of by providing a thermostatically-controlled heater 58 on the gas flowing to the compressor 36, as shown in FIG. 3 of the drawings. Preferably, as more fully brought out hereinafter, the thermostat 59 will maintain the inlet gas to be a minimum of −15° F.

The following calculations are given by way of example only, as applied to sulfur-hexafluoride ($SF_6$) gas:

Temperature required in H.P. system +50° F.
Pressure in H.P system=220 p.s.i.g. at 50° F.
Pressure in L.P. system=38 p.s.i.g. at 50° F.
Required inlet temperature to compressor to provide at least a 50° F. discharge.

$$T_1 = T_2\left(\frac{P_1}{P_2}\right)^{\frac{k-1}{k}}$$
$$= 510\left(\frac{53}{235}\right)^{\frac{1.1-1}{1.1}}$$

Adiabatic compression in the gas compressor 36

$$= \frac{510}{(4.44)} \cdot 091 = \frac{510}{1.146} = 445° \text{ R.}$$

This would indicate that heaters 58 would be required on the inlet of the compressor 36 and be energized, when required, to maintain the compressor inlet gas temperature about −15° F. (445° R.).

The use of the special thermostatically-actuated valve 48 will permit an alternate system to the arrangement illustrated in FIG. 3 of the drawings, namely, the arrangement set forth in FIG. 2 of the drawings. Here it will be noted that the thermostatically-actuated valve 48 is associated directly with the high-potential, high-pressure reservoir tank 13, and not with the externally-located grounded tanks 25, as described previously in connection with FIG. 3 of the drawings. In the system illustrated in FIG. 3 the gas is heated in the high-pressure chamber 13 only by convection from the auxiliary reservoirs 25. If the system design was such that heating by convection was not sufficient, the thermostatic valve 58 could be installed on the high-potential high-pressure chamber 13 itself, which would then bleed gas directly into the interior 34 of the exhaust tank 2. Application of the valve 48 at such a high-potential location is permitted since there are no controlling wires required.

Figure 6:
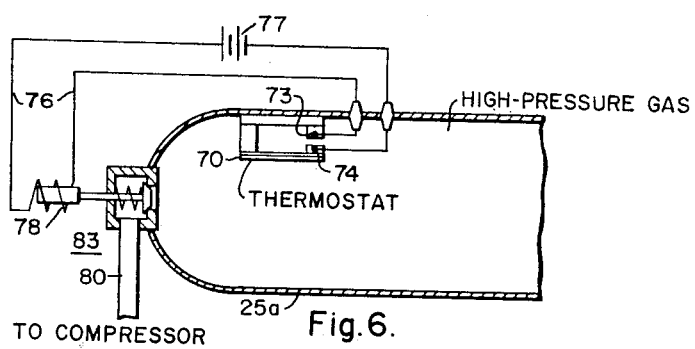

A second modification to the aforesaid arrangement of FIG. 3 is set forth in FIG. 6 of the drawings. Here a thermostat 70 is employed, being disposed internally of the tank 25a. When the temperature within the tank 25a drops below a predetermined point, the contacts 73, 74 are closed, and connect the control circuit 76 through the battery 77 to the electrically-actuated bleeder valve 78 to effect thereby bleeding of the high-pressure gas through the pipe 80. The pipe 80 is similar to the pipe 24, and bleeds the gas directly to the compressor 36.

The heat exchanger 85 ensures that the gas entering the compressor 36 is at ambient temperature. Thus, if the gas from the high-pressure tanks 25 enter the compressor directly, the throttling of the gas within the valve mechanism 48 would have cooled the gas to below ambient temperature. It is, therefore, more efficient to utilize the ambient temperature to raise the temperature of the exhausted gas within pipe 24 to bring it up to at least ambient temperature.

From the foregoing description, it will be apparent that the present invention is concerned with the utilization of the heat of compression for raising the temperature of the gas within the high-pressure reservoirs 13, 25. The thermostatically-actuated valve 48, including the bimetallic valve disk 53, may be located either on the grounded auxiliary high-pressure reservoir tank 25, as illustrated in FIG. 3 of the drawings, or as shown in FIG. 2 of the the drawings, the temperature-responsive valve 48 may be disposed in the wall of the high-voltage high-pressure reservoir tank 13. As a modification, the temperature-responsive valve arrangement 83, as illustrated in FIG. 6, may be employed, utilizing a thermostat 70, which is responsive to the temperature of the gas within the tank 25a. Upon closing of the contacts 73, 74, the electrically-actuated valve 83 will be opened to permit consequent bleeding of the high-pressure gas into the compressor 36, as previously described.

It is to be clearly understood that sulfur-hexafluoride ($SF_6$) gas was described merely by way of illustration, and that the present invention is applicable to other gases as well as to $SF_6$.

Although there have been illustrated and described specific structures, it is to be clearly understood that the same were merely for the purpose of illustration, and that changes and modifications may readily be made therein by those skilled in the art, without departing from the spirit and scope of the invention.

We claim as our invention:

A compressed-gas circuit interrupter including a high-pressure reservoir chamber, means for establishing an arc, blast-valve means for utilizing a blast of gas from said high-pressure reservoir chamber to effect extinction of said arc, a compressor for compressing gas for supplying high-pressure gas to said high-pressure chamber and gas-bleeding means responsive to a predetermined low temperature of the high-pressure gas for bleeding gas from the high-pressure reservoir to the low-pressure side of the compressor, whereby the heat of compression supplied by the compressor will raise the temperature of the compressed gas issuing from the compressor and so raise the temperature level within said high-pressure reservoir chamber.

References Cited in the file of this patent

UNITED STATES PATENTS

| | | |
|---|---|---|
| 1,972,170 | Spencer | Sept. 4, 1934 |
| 1,972,171 | Spencer | Sept. 4, 1934 |
| 2,955,182 | Caswell et al. | Oct. 4, 1960 |
| 3,029,612 | Victor | Apr. 17, 1962 |

OTHER REFERENCES

A New Concept in Power Circuit Breaker Design Utilizing $SF_6$, R. E. Friedrich, R. N. Yeckley, presented at AIEE winter general meeting, New York, N.Y., Feb. 1-6, 1959.